US009365940B2

(12) United States Patent
Tsai et al.

(10) Patent No.: US 9,365,940 B2
(45) Date of Patent: Jun. 14, 2016

(54) METHOD FOR PRODUCING POROUS COPPER FOIL

(75) Inventors: Chen-Ping Tsai, Miaoli (TW); Jui-Chang Chou, Miaoli (TW); Kuei-Sen Cheng, Miaoli (TW)

(73) Assignee: Chang Chun Petrochemical Co., Ltd., Taipei (TW)

( * ) Notice: Subject to any disclaimer, the term of this patent is extended or adjusted under 35 U.S.C. 154(b) by 999 days.

(21) Appl. No.: 13/004,310

(22) Filed: Jan. 11, 2011

(65) Prior Publication Data

US 2012/0111733 A1    May 10, 2012

(30) Foreign Application Priority Data

Nov. 8, 2010   (TW) ................................ 99138304 A

(51) Int. Cl.
*C25D 3/38* (2006.01)
*C25D 17/00* (2006.01)
*F16M 13/00* (2006.01)
*F16M 11/04* (2006.01)
*C25C 1/12* (2006.01)
*C25D 1/04* (2006.01)
*H01M 4/66* (2006.01)
*H01M 10/052* (2010.01)

(52) U.S. Cl.
CPC ... *C25C 1/12* (2013.01); *C25D 1/04* (2013.01); *H01M 4/661* (2013.01); *H01M 10/052* (2013.01)

(58) Field of Classification Search
CPC C25B 11/35; C23C 14/5873; C23C 18/1208; C25D 3/38; C25D 17/00; C25C 1/12; F16M 13/00; F16M 11/04

USPC .............. 205/112, 758, 350, 85, 87, 291, 640
See application file for complete search history.

(56) References Cited

U.S. PATENT DOCUMENTS

| 4,088,544 | A | 5/1978 | Hutkin | |
|---|---|---|---|---|
| 6,153,077 | A * | 11/2000 | Kato et al. | ....................... 205/77 |
| 6,544,664 | B1 | 4/2003 | Takahashi et al. | |
| 7,175,920 | B2 * | 2/2007 | Suzuki et al. | .................. 428/615 |
| 2001/0027922 | A1 | 10/2001 | Chen et al. | |
| 2006/0051677 | A1 | 3/2006 | Matsushima et al. | |

FOREIGN PATENT DOCUMENTS

| EP | 1038994 A1 | 9/2000 |
|---|---|---|
| JP | 8-236120 | 9/1996 |
| JP | 9-306504 | 11/1997 |
| JP | 1998-112326 A | 4/1998 |
| JP | 2001-205157 | 7/2001 |
| WO | WO00/15875 | 3/2000 |

OTHER PUBLICATIONS

伊勢秀夫,, 電鑄技術與應用,, 槇書店,, May 25, 1996, p. 39-43.

* cited by examiner

*Primary Examiner* — Zulmariam Mendez
(74) *Attorney, Agent, or Firm* — Polsinelli PC

(57) ABSTRACT

The present invention provides a method for producing a porous copper foil. The method of the present invention includes the steps of forming an oxide film by providing a chromium-containing compound to a metal surface of a cathode; forming a copper foil on the oxide film by performing electrolysis of copper; and removing the copper foil from the metal surface of the cathode. The method of the present invention is simple and time-saving, and the porous copper foil of the present invention has reduced roughness difference between both sides of the porous copper foil.

17 Claims, 3 Drawing Sheets

METHOD FOR PRODUCING POROUS COPPER FOIL

CROSS-REFERENCES TO RELATED APPLICATIONS

This application claims under 35 U.S.C. §119(a) the benefit of Taiwanese Application No. 099138304, filed Nov. 8, 2010, the entire contents of which is incorporated herein by reference.

BACKGROUND OF THE INVENTION

1. Field of the Invention

The present invention relates to methods for producing a copper foil, and more particularly, to a method for producing a porous copper foil.

2. Description of Related Art

Recently, notebook computers, mobile phones, PDA are developed to be minimized and lightened, and batteries thereof thus need to be minimized Nonaqueous electrolyte secondary batteries, such as lithium ion secondary batteries, have high energy density and high capacity, and thus are widely used in the above mentioned electronic devices.

In lithium ion secondary batteries, lithium transition-metal composite oxide used as material of a positive electrode (cathode) and carbon material such as graphite used as a negative electrode (Anode) are respectively mixed with a conductive agent and a binder to form a paste for coating respective collectors such as an aluminum foil and a copper foil, so as to form a positive electrode and a negative electrode. A separator is disposed between the two electrodes to form a battery set, and electrolyte solution is injected into the battery set to form a lithium ion secondary battery. While recharging the battery, the lithium ions in the material of the positive electrode move to the material of the negative electrode. However, while discharging the battery, the lithium ions in the material of the negative electrode move to the crystal structure of the positive electrode. When the cycle of charge/discharge repeats, the lithium ions exchange between the positive electrode and the negative electrode. Therefore, it is critical to efficiently use lithium ions in the battery for high performance lithium ion secondary batteries.

Generally, an electrolytic copper foil or a rolled copper foil is used as a collector of a negative electrode in a lithium ion secondary battery. The electrolytic copper foil and the rolled copper foil both have two flat surfaces for carbon material to be evenly coated thereon. When the thickness of the coated carbon material on the copper foil is not even, the usage efficiency of the active substance (i.e. lithium ions) is poor, and thus the capacity of the battery is reduced. To address this issue, a porous copper foil is used in the prior art, in which the copper foil having through-pores made in a direction of thickness of the foil, such that lithium ions freely move through both sides of the copper foil, and thus lithium ions are efficiently used and capacity of the battery is increased. In addition, for the same battery volume, the porous copper foil has increased surface area for accommodating more carbon material, such that the battery has more capacity. The adhesiveness between the porous copper foil and the carbon material is increased due to the increased contact area between the porous copper foil and the carbon material, such that after charge/discharge of the battery, the carbon material is not easily peeled, and thus the battery maintains high capacity and has extended life. Hence, to efficiently use lithium ions in lithium ion secondary batteries, a porous copper foil with through-pores is used as a collector of a negative electrode.

Japanese Patent No. 10-112326 discloses a method for forming a copper foil having a porous structure, in which a stainless tube coated with a polyester felt is disposed on a titanium drum; the polyester felt contacts the surface of the drum; a PVC tube is disposed on the stainless tube; sulfuric acid solution is directed to the polyester felt through the opening of the PVC tube; voltage is applied between the stainless tube and the drum to electrolyze the sulfuric acid solution for oxidizing titanium on the surface of the drum to form a titanium oxide film; electroplating is performed on the drum to form a copper foil; and the copper foil is continuously stripped so as to form an electrolytic copper foil with a porous structure.

Japanese Patent No. 10-112326 also discloses various cathode oxidation devices such as the polyester felt for accommodating sulfuric acid to make the sulfuric acid contact the drum, a tank for accommodating an acidic solution, a bottle for accommodating an acidic acid, and a container having a nozzle for spraying an acidic acid. Further, voltage is applied between each of the above devices and the drum for oxidizing the drum to form an oxide film with a thickness of at least 14 nm, and then electroplating is performed to form a porous copper foil.

Taiwanese Patent No. 428049 discloses a method for forming a copper foil having through-pores, wherein a surface of a cathode is treated by coating with lipid, electroplating with copper pyrophosphate, or applying voltage with an acidic solution to form an oxide film; electrolysis of copper is formed on the treated surface of the cathode; and the cathode is stripped to obtain a copper foil. Further, Taiwanese Patent No. 428049 discloses that the difference in roughness (Rz) of both sides of the copper foil is 5-20 μm, and the copper foil thus has good adhesiveness with active substance while being used as a collector in a secondary battery.

While forming a lithium ion secondary battery, active materials of a positive and a negative electrodes are respectively mixed with a conductive agent and a binder to form a past material for being coated on corresponding collectors (such as an aluminum foil and a copper foil). It is known in the art that when both sides of the copper foil have similar roughness and uniformity, the resulting lithium ion secondary battery has better performance. On the contrary, when both sides of the copper foil have significantly different surface profiles, the both sides of the copper foil have different roughness and uniformity, and the resulting lithium ion secondary battery has reduced performance.

It is clear that the usage of porous copper foil overcomes the reduced performance resulting from the uneven coating of carbon material. However, the formation of a porous copper foil usually results in the increased roughness Rz of Matte side (surface of the copper foil without contacting the drum cathode); and when there is a severe difference in the roughness Rz between the Matte side and Shiny side (surface of the copper foil contacting the drum cathode), uneven coating of carbon material occurs and thus performance of the lithium ion secondary battery increased by the porous copper foil is offset. Therefore, there is a need to develop a method for forming a porous copper foil having great flatness and similar roughness of both sides so as to overcome uneven coating of carbon material and to achieve efficient usage of lithium ions.

In addition, the conventional method for forming a porous copper foil is complicated, wherein a thin copper layer is formed on the surface of a cathode by electrolysis, and the surface of the cathode is treated by coating with lipid or applying voltage with an acidic solution to form an oxide film on the surface of the cathode. Moreover, the residual lipid or residual oxide film may influence the surface quality of the copper foil, and further affect efficacy of the secondary battery. Hence, there is a need to develop a method for forming an improved porous copper foil.

SUMMARY OF THE INVENTION

The present invention provides a method for producing a porous copper foil. The method of the present invention includes the steps of forming an oxide film by providing a chromium-containing compound to a metal surface of a cathode; forming a copper foil on the oxide film by performing electrolysis of copper; and removing the copper foil from the metal surface of the cathode.

In the method of the present invention, the chromium-containing compound is transferred to the metal surface of the cathode, and then electrolysis of copper is performed. Specifically, the chromium-containing compound is transferred to form the oxide film without applying voltage on the metal surface.

In the method of the present invention, the chromium-containing compound is one selected from the group consisting of chromic acid, dichromic acid, a derivative thereof and a mixture thereof. The derivative of chromic acid or dichromic acid needs to have property of an oxidizing agent but is not specifically limited. For example, a chromium-containing salt or a chromium-containing organic compound such as pyridinium chlorochromate is used in the method of the present invention. The chromium-containing compound may be one selected from the group consisting of chromic acid ($H_2CrO_4$), dichromic acid ($H_2Cr_2O_7$), chromium trioxide, potassium dichromate ($K_2Cr_2O_7$), cesium dichromate ($CsCr_2O_7$), sodium dichromate ($Na_2Cr_2O_7$), zinc dichromate ($ZnCr_2O_7$), barium dichromate ($BaCr_2O_7$) or lead chromate ($PbCrO_4$). In addition, the chromium-containing compound may be one or a combination of the above compounds.

For persons skilled in the art, the material of the cathode and the material for electrolysis are determined according to the conditions for producing the copper foil. In one embodiment, the metal of the cathode is aluminum, aluminum alloy, titanium or titanium alloy. The electrolyte solution for electrolysis of copper includes, but is not limited to, copper sulfate solution.

In one embodiment, the chromium-containing compound is transferred to the metal surface by a device including a metal roller, a sponge coated on the metal roller and an introducing component. The introducing component is disposed on the sponge for introducing the chromium-containing compound into the sponge, and may or may not contact the sponge. The sponge coated on the surface of the roller contacts the surface of the cathode for transferring the chromium-containing compound to the surface of the cathode. The transferring is performed by the device, such that splatter of the chromium-containing compound is avoided.

In one embodiment, the chromium-containing compound is transferred to the metal surface of the cathode by a device including a metal tube having a plurality of openings and coated with a sponge layer, wherein the sponge on the metal tube contacts the metal surface, and the chromium-containing compound is introduced into the metal tube, absorbed in the sponge layer via the openings and then transferred to the metal surface. The transferring is performed by such device, such that the chromium-containing compound is not easily splattering and an even transferring is achieved In the present invention, the method further includes the step of performing a rust prevention treatment after removing the copper foil. In one embodiment of the rust prevention treatment, the copper foil is treated by chromic acid. Specifically, after being removed from the cathode, the copper foil is immediately placed in chromic acid solution in a rust prevention tank. Certainly, the copper foil can be treated for rust prevention in the future processing.

In the method of the present invention, the chromium-containing compound is used on the cathode to form an oxide film, the chromium-containing compound such as chromic acid or dichromic acid is directly transferred on the cathode, and then electrolysis of copper is performed to form a porous copper foil. There is no need to apply voltage between the cathode and the oxidizing solution in the present invention. However, in the conventional method, an external voltage supply device is needed for the oxidation of the cathode. For example, a copper pyrophosphate bath is provided on the cathode for electroplating or an acidic acid solution (such as sulfuric acid) is provided to the cathode for electrolysis and oxidization. In comparison with the conventional method, the method of the present invention is simpler and cheaper.

Further, a porous copper foil is generally treated with rust prevention, in which chromic acid is frequently used in the rust prevention treatment for the copper foil. In the present invention, the chromium-containing compound is oxidized on the cathode, thus some chromium oxide may remain on the porous copper foil. Such residuals on the copper foil are similar to the material upon the rust prevention treatment. Therefore, the influence resulting from the residual oxide film on the porous copper foil is significantly reduced, and thus it is advantageous for the copper foil to be used in a lithium ion secondary battery. On the contrary, the coating of lipid is used in the conventional method; however, the residual lipid on the porous copper foil influences property of the surface of the porous copper foil, and is disadvantageous for the porous copper foil to be used in a lithium ion secondary battery.

In addition, in comparison with the prior art, there is less roughness difference between both sides of the porous copper foil in the present invention. It is clear that both sides of the porous copper foil of the present invention have similar surface properties and similar coating thicknesses of carbon material, such that a lithium ion secondary battery having the porous copper foil of the present invention has better performance. Accordingly, in comparison with the prior art, the porous copper foil of the present invention is more advantageous for the formation of a lithium ion secondary battery.

DETAILED DESCRIPTION OF THE PREFERRED EMBODIMENTS

The detailed description of the present invention is illustrated by the following specific examples. Persons skilled in the art can conceive the other advantages and effects of the present invention based on the disclosure contained in the specification of the present invention.

Figure 1:
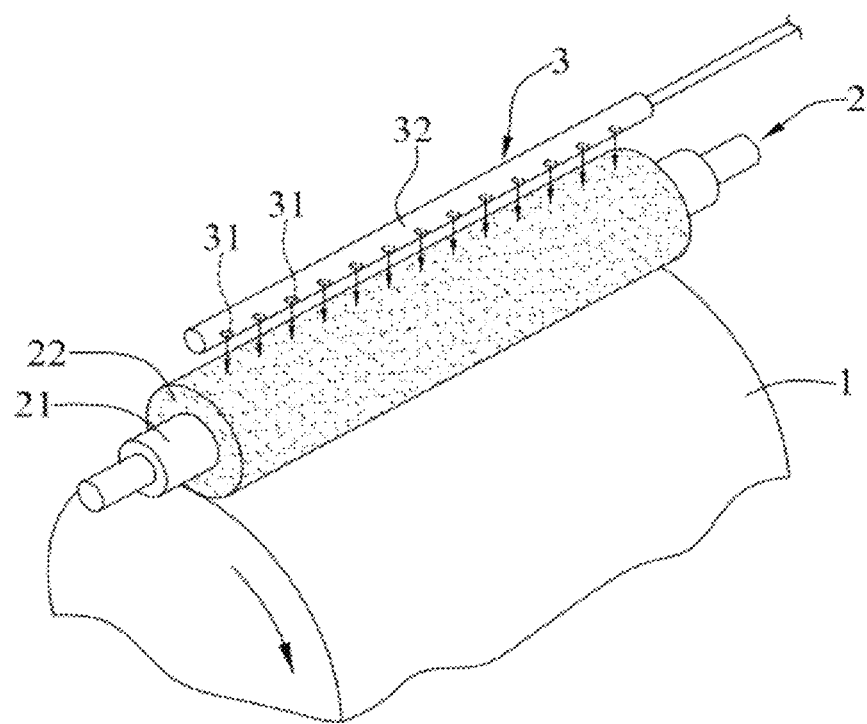
FIG. 1 is a schematic view showing a transfer device using chromic acid according to the embodiment of the present invention.

In this embodiment, the chromium-containing compound is transferred by a device shown in FIG. 1. As shown in FIG. 1, the device includes a transfer device 2 having a metal roller 21, which may be a stainless roller, and a sponge 22; and an introducing component 3 disposed on the transfer device 2. The transfer device 2 contacts a cathode 1 without interfering with the rotation of the transfer device 2 and the cathode 1.

The introducing component 3 includes a tube 32 having a plurality of openings 31. The material of the tube 32 may be, but not limited to, PVC. The tube 32 is disposed above the transfer device 2. In this embodiment, there is no contact between the tube 32 and the transfer device 2. Chromic acid is introduced in the tube 32, and absorbed by the sponge 22 via the openings 31. While rotating the transfer device 2 and the cathode 1, the transfer device 2 keeps contacting the cathode 1, such that the surface of the cathode 1 is attached with the chromic acid, which is absorbed by the sponge 22 of the transfer device 2, and the chromic acid is transferred. Chromic acid is transferred in a manner that chromic acid is absorbed by the sponge, and then contacts the surface of the cathode, such that chromic acid would not sputter during transferring. The present invention is advantageous to operation and industry.

Figure 2:
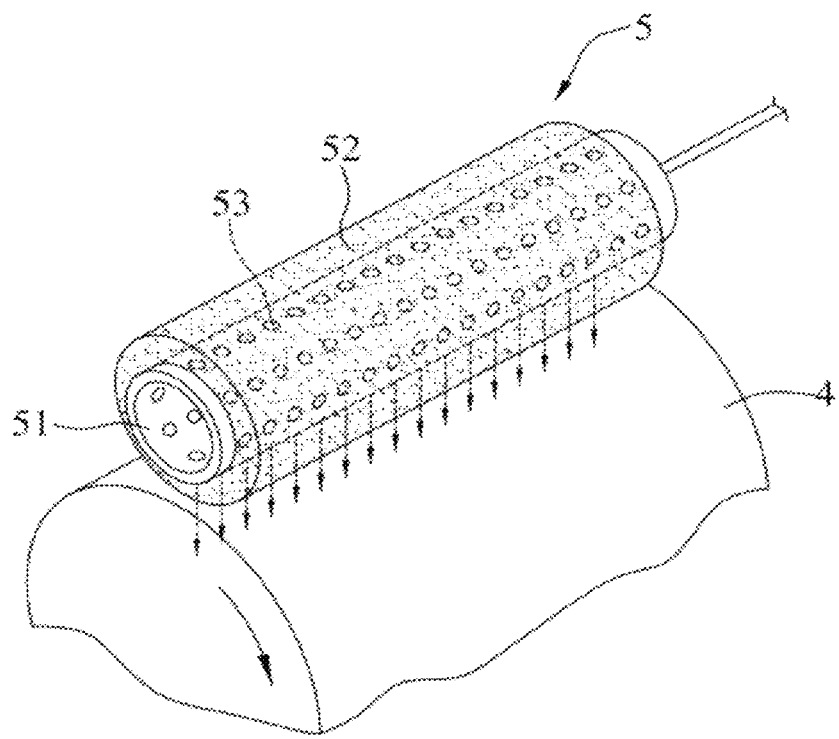
FIG. 2 is a schematic view showing a transfer device using chromic acid according to the embodiment of the present invention.

In another embodiment, the chromium-containing compound of the present invention is transferred by a device shown in FIG. 2. As shown in FIG. 2, a transfer device 5 is a metal tube 51, which may be a stainless tube, coated with a sponge layer 52, and the metal tube 51 has a plurality of openings 53 on a surface thereof. The transfer device 5 is disposed to contact the cathode 4 without interfering with the rotation of the transfer device 5 and the cathode 4.

The shape and amount of the openings 53 on the metal tube 51 are not limited. The metal tube 51 has one end connected to a source of chromic acid, and has the other end being open, closed or connected to a device for outputting chromic acid. While the transfer device 5 contacts the cathode 4, the transfer device 5 keeps contacting the cathode 4, and chromic acid in the metal tube 51 is output to the sponge 52 via the openings 53, and then transferred to the surface of the cathode 4. Since chromic acid is output to the sponge 52 via the openings, the sponge 52 can efficiently and evenly absorb chromic acid, and chromic acid is evenly transferred to the surface of the cathode 4 without sputtering. The design of the present invention facilitates the operation and application in industry.

Figure 3:
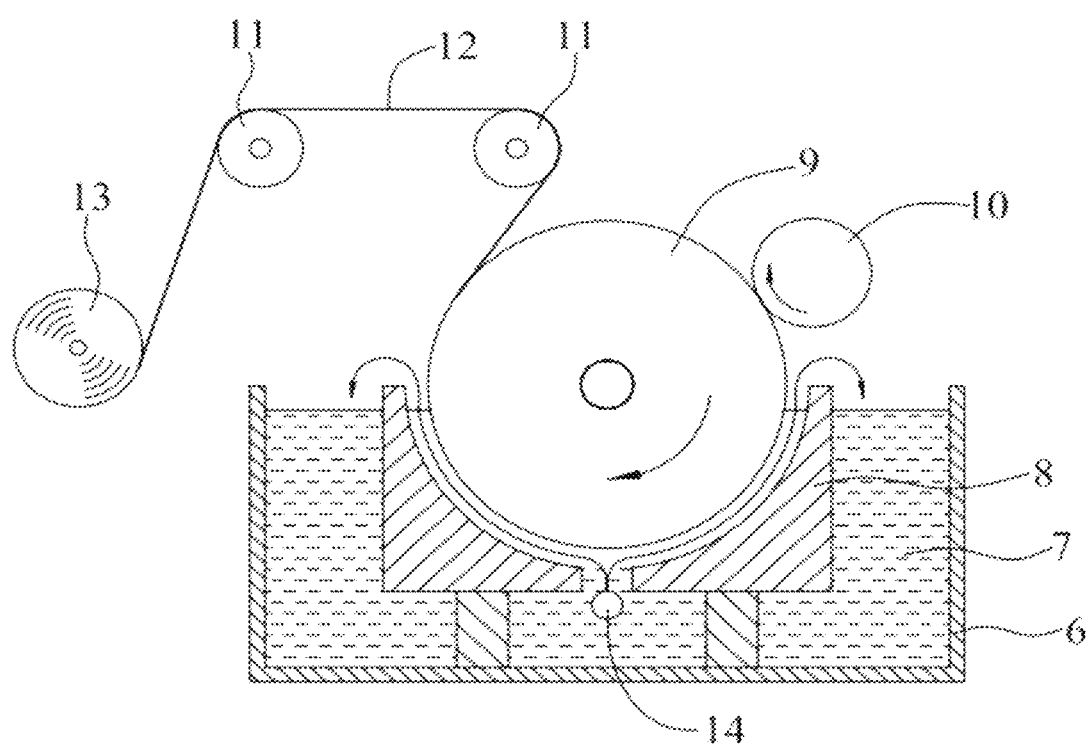
FIG. 3 is a schematic view showing a device for producing a porous copper foil according to the embodiment of the present invention.

In this embodiment, the device shown in FIG. 3, for example, can be used in the method of the present invention. As shown in FIG. 3, electrolytic solution 7 is provided in an electrolysis tank 6, which has an anode 8 and a tube 14 for introducing the electrolytic solution. The drum cathode 9 is disposed in the electrolysis tank 6, and a portion of the cathode 9 contacts the electrolytic solution 7. The transfer device 10 is disposed for contacting another portion of the cathode 9 without interfering with the respective rotation of the transfer device 10 and the cathode 9. The transfer device in this embodiment can be the transfer devices shown in FIG. 1 and FIG. 2.

In the device shown in FIG. 3, the cathode 9 may be made of aluminum, aluminum alloy, titanium or titanium alloy. In the following embodiments, a titanium drum is used as a cathode 9, and a titanium anode 8 has $IrO_2$ coated on the surface thereof. The electrolytic solution 7 is copper solution, and preferably copper sulfate solution.

In the method of the present invention, the chromium-containing compound such as sodium dichromate is transferred to a drum surface of the titanium cathode 9 by the transfer device 10, and then the drum of the cathode rotates to contact the electrolytic solution 7 for performing electrolysis. A thin copper layer is formed on the surface of the drum, and then the drum rotates to leave the electrolytic solution. The thin copper layer is removed from the surface of the drum by a removing device 11, and then this porous copper foil 12 is obtained and collected by a winding device 13.

In one embodiment, after the thin copper layer is removed from the surface of the drum by the removing device 11, the porous copper foil 12 is obtained and sent to a tank having chromic acid for rust prevention treatment, and then collected by the winding device 13.

In one embodiment, the titanium cathode 9 shown in FIG. 3 is a drum or a belt, and may be modified by persons skilled in the art according to operation conditions.

Example 1

The chromium-containing compound was transferred by the transfer device shown in FIG. 1, wherein the chromium-containing compound was chromic acid. In Examples 1-1 to 1-5, the concentrations of chromic acid were 1.2, 0.5, 2.0, 3.0, 5.0 (g/L), respectively. In each Example, the chromic acid was introduced into an introducing component 3, which may be a PVC tube, at 100 mL/hr, then dropped on the sponge 22 via the openings 31 of the introducing component 3, and was transferred to the surface of the cathode.

Operation conditions for electrolysis of the copper foil:
Composition of electrolysis bath:
Concentration of copper sulfate: 290 g/L
Concentration of sulfuric acid: 100 g/L
Temperature of electrolytic solution: 40° C.
Current density: 33 $A/dm^2$ Example 2

The device and operation conditions in this embodiment are similar to those of Embodiment 1 except that the chromium-containing compound is sodium dichromate (1.2 g/L).

Figure 4A:
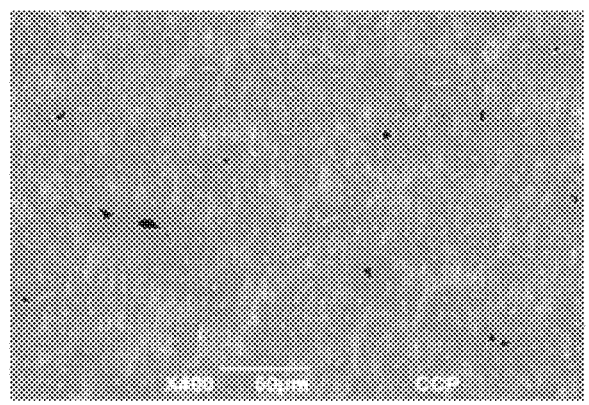
FIG. 4A is an image showing Shiny side of the porous copper foil of the present invention at 400× magnification by electron microscope.
Figure 4B:
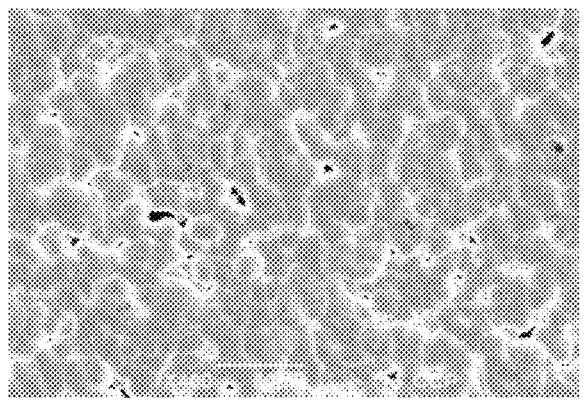
FIG. 4B is an image showing Matte side of the porous copper foil of the present invention at 400× magnification by electron microscope.
Figure 4C:
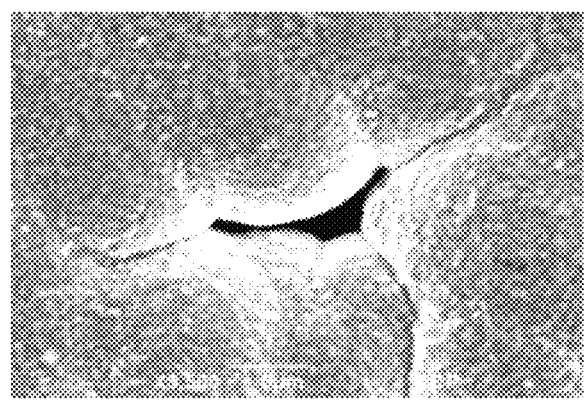
FIG. 4C is an image showing Matte side of the porous copper foil of the present invention at 3500× magnification by electron microscope.

The property of the porous copper foils obtained from Example 1 and Example 2 are listed in Table 1. FIG. 4A to FIG. 4C are images showing the pores of the porous copper foil prepared in Example 1-1 by electron microscope.

TABLE 1

| Example No. | Chromium-containing compound | Concentration (g/L) | Thickness of copper foil (μm) | Pore density of copper foil (1/mm2) | Diameter of pore (μm) | Rz of Shiny side (μm) | Rz of Matte side (μm) | Rz difference between both sides (μm) |
|---|---|---|---|---|---|---|---|---|
| 1-1 | Chromic acid | 1.2 | 10 | 208 | 1-30 | 1.17 | 3.58 | 2.41 |
| 1-2 | Chromic acid | 0.5 | 10 | 117 | 1-20 | 1.10 | 2.95 | 1.85 |
| 1-3 | Chromic acid | 2.0 | 10 | 176 | 1-30 | 1.14 | 3.80 | 2.66 |

TABLE 1-continued

| Example No. | Chromium-containing compound | Concentration (g/L) | Thickness of copper foil (μm) | Pore density of copper foil (1/mm2) | Diameter of pore (μm) | Rz of Shiny side (μm) | Rz of Matte side (μm) | Rz difference between both sides (μm) |
|---|---|---|---|---|---|---|---|---|
| 1-4 | Chromic acid | 3.0 | 10 | 131 | 1-30 | 1.08 | 3.70 | 2.62 |
| 1-5 | Chromic acid | 5.0 | 10 | 72 | 1-30 | 1.10 | 3.81 | 2.71 |
| 2 | Sodium dichromate | 1.2 | 10 | 180 | 1-30 | 1.21 | 4.57 | 3.36 |

As shown in Table 1, in the present invention, the chromium-containing compound is directly provided to form an oxide film on a cathode (without applying voltage for oxidization), and Rz difference between Matte side and Shiny side of the obtained porous copper foil is less than 5 μm. In other words, the porous copper foil of the present invention has flatter surface in comparison with the prior art. Further, the change of chromic acid concentration has no influence on the roughness of Matte side and Shiny side, but has influence on the pore diameter and pore density of the porous copper foil in the present invention. In comparison with the copper foil prepared by using chromic acid (1.2 g/L), when the concentration of chromic acid is 0.5 g/L, the obtained porous copper foil has smaller pore diameter and reduced pore density; and when the concentration of chromic acid is more than 2.0 g/L, the pore density of the obtained copper foil is also reduced. Hence, the concentration of chromic acid is preferably 1.0-2.0 g/L for producing a porous copper foil having better pore density and flatness in the present invention.

The invention has been described using exemplary preferred embodiments. However, it is to be understood that the scope of the invention is not limited to the disclosed arrangements. The scope of the claims, therefore, should be accorded the broadest interpretation, so as to encompass all such modifications and similar arrangements.

The invention claimed is:

1. A method for producing a porous copper foil, comprising the steps of:
    transferring a chromium-containing compound to a metal surface of a cathode, the transferring of the chromium-containing compound to the metal surface being achieved without applying voltage on the metal surface;
    rotating the cathode comprising the chromium containing compound into immediate contact with an electrolytic solution, the electrolytic solution comprising copper ions;
    depositing a copper foil on the cathode containing the chromium-containing compound by performing electrolysis of copper; and
    removing the copper foil from the metal surface of the cathode to obtain a porous copper foil having a difference in surface roughness Rz between the as deposited matte side and the as deposited shiny side of the copper foil in the range of 1.85-3.36 μm.

2. The method of claim 1, wherein after the chromium-containing compound is transferred to the metal surface of the cathode the step of forming the copper foil is performed immediately thereafter.

3. The method of claim 2, wherein the chromium-containing compound is transferred to the metal surface by a device including a metal roller, a sponge covered on the metal roller and an introducing component.

4. The method of claim 2, wherein the chromium-containing compound is transferred to the metal surface by a device including a metal tube having a plurality of openings and coated with a sponge layer.

5. The method of claim 4, wherein the metal tube contacts the metal surface, and the chromium-containing compound is introduced into the metal tube, absorbed in the sponge layer via the openings and then transferred to the metal surface.

6. The method of claim 1, wherein any oxide film formed by converting the chromium-containing compound into an oxide is performed without applying voltage on the metal surface.

7. The method of claim 1, wherein the chromium-containing compound is one selected from the group consisting of chromic acid, dichromic acid, a derivative thereof and a mixture thereof.

8. The method of claim 1, wherein the chromium-containing compound is one selected from the group consisting of chromic acid, dichromic acid, chromium trioxide, potassium dichromate, cesium dichromate, sodium dichromate, zinc dichromate, barium dichromate, lead dichromate and a mixture thereof.

9. The method of claim 1, wherein the chromium-containing compound is transferred to the metal surface by a device including a metal roller, a sponge covered on the metal roller and an introducing component.

10. The method of claim 9, wherein the sponge contacts the metal surface for transferring the chromium-containing compound to the metal surface.

11. The method of claim 9, wherein the introducing component is disposed on the sponge for introducing the chromium-containing compound into the sponge.

12. The method of claim 11, wherein the sponge contacts the metal surface for transferring the chromium-containing compound to the metal surface.

13. The method of claim 1, wherein the chromium-containing compound is transferred to the metal surface by a device including a metal tube having a plurality of openings and coated with a sponge layer.

14. The method of claim 13, wherein the metal tube contacts the metal surface, and the chromium-containing compound is introduced into the metal tube, absorbed in the sponge layer via the openings and then transferred to the metal surface.

15. The method of claim 1, further comprising the step of performing a rust prevention treatment after removing the copper foil.

16. The method of claim 1, wherein the pore density of the pores in the porous copper foil is within the range of 72-131 l/mm$^2$.

17. The method of claim 1, wherein the pore diameter of the pores in the porous copper foil is within the range of 1-30 μm.

* * * * *